United States Patent [19]

Yeomans

[11] Patent Number: 4,893,181
[45] Date of Patent: Jan. 9, 1990

[54] INTERACTIVE IMAGE MODIFICATION

[75] Inventor: Andrew J. V. Yeomans, Hertfordshire, England

[73] Assignee: Crosfield Electronics Limited, London, England

[21] Appl. No.: 252,405

[22] Filed: Oct. 3, 1988

[30] Foreign Application Priority Data

Oct. 2, 1987 [GB] United Kingdom ............... 8723203

[51] Int. Cl.$^4$ ............................................. H04N 1/46
[52] U.S. Cl. ...................................... 358/80; 358/75; 358/78
[58] Field of Search .................... 358/275, 278, 80, 76

[56] References Cited

U.S. PATENT DOCUMENTS

| | | | |
|---|---|---|---|
| 3,893,166 | 7/1975 | Pugsley | 358/80 |
| 4,037,249 | 7/1977 | Pugsley | 358/80 |
| 4,393,399 | 7/1983 | Gast | 358/78 |
| 4,477,833 | 8/1984 | Clark | 358/78 |
| 4,496,968 | 1/1985 | Pugsley | 358/75 |
| 4,577,219 | 3/1986 | Klie | 358/75 |
| 4,608,596 | 8/1986 | Williams | 358/75 |
| 4,639,770 | 1/1987 | Jung et al. | 358/76 |
| 4,639,771 | 2/1987 | Hattori | 358/80 |
| 4,727,425 | 2/1988 | Mayne | 358/78 |

FOREIGN PATENT DOCUMENTS

| | | | |
|---|---|---|---|
| 0111026 | 6/1984 | European Pat. Off. | 358/80 |
| 0183539 | 6/1986 | European Pat. Off. | 358/78 |
| 0188098 | 7/1986 | European Pat. Off. | 358/80 |
| 01408 | 3/1985 | PCT Int'l Appl. | 358/76 |

Primary Examiner—James J. Groody
Assistant Examiner—Jerome Grant
Attorney, Agent, or Firm—Sughrue, Mion, Zinn, Macpeak & Seas

[57] ABSTRACT

Apparatus for interactively modifying an image represented by digital data defining the color component content of pixels of the image, comprises an image store for storing the said digital data; a display; look-up tables defining retouch curves for each color component; and a microprocessor for applying the image in the image store to the LUTs and thereafter to the display to display the retouched image. The microprocessor also enables an operator to modify the retouch curves so that a second selected image point is retouched to the color of a first selected image point by modifying a color component retouch curve for each color component used to define the original image such that a pixel located at the second selected point will be retouched to have the color content of a pixel at the first selected point.

6 Claims, 4 Drawing Sheets

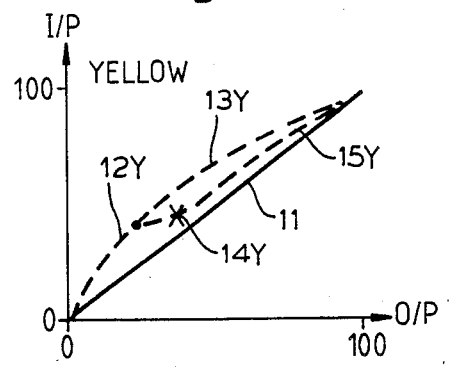
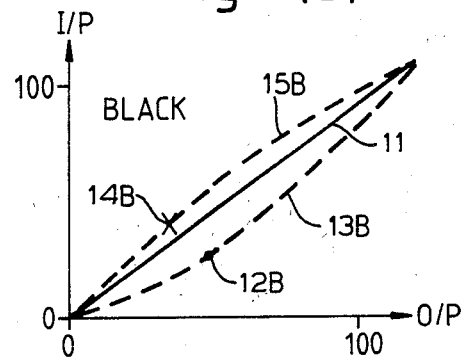
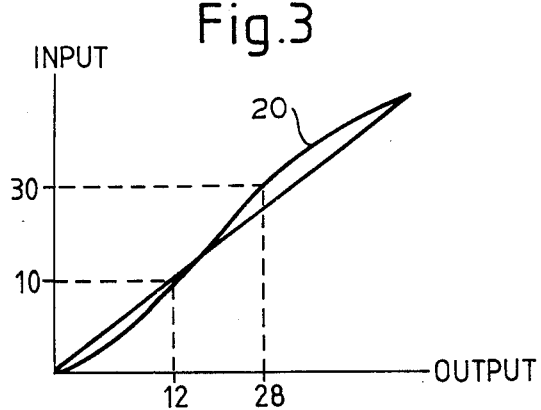

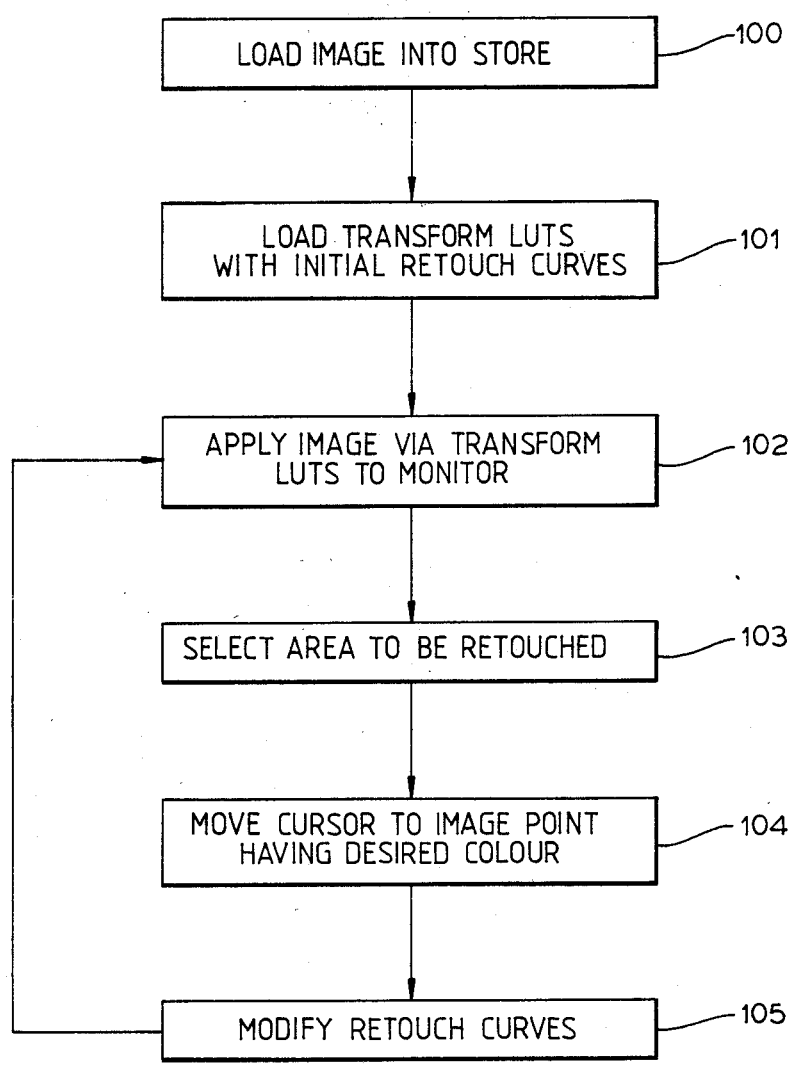

INTERACTIVE IMAGE MODIFICATION

FIELD OF THE INVENTION

The invention relates to a method of interactively modifying an image.

DESCRIPTION OF THE PRIOR ART

It is common practice, in preparing an image such as a picture for printing to modify a digital representation of the image by adjusting the colours of pixels of the image. Typically, this is achieved by loading respective look-up tables with data defining retouch curves for each colour component. Subsequently, the original digital data is used to address the look-up tables which generate modified or retouch data.

In the past, colour retouching has been achieved by displaying on a monitor screen graphs representing colour component retouch curves for each colour component. The form of these curves is then modified. After the modification, the original image is redisplayed under the control of the modified retouch curves to allow the effects of the modification to be viewed. This suffers from the disadvantage that it requires considerable experience on the part of an operator to know the effect of the modifications to the retouch curves he is making since otherwise he will have to wait for the redisplay of the image after each modification to see the result of the modifications.

SUMMARY OF THE INVENTION

In accordance with one aspect of the present invention, a method of interactively modifying an image represented by digital data defining the colour component content of pixels of the image comprises
  (i) displaying a representation of the image on a monitor;
  (ii) selecting first and second points on the displayed image; and
  (iii) modifying a colour component retouch curve for each colour component used to define the original image such that a pixel located at the second selected point will be retouched to have the colour content of a pixel at the first selected point.

In accordance with a second aspect of the present invention, apparatus for interactively modifying an image represented by digital data defining the colour component content of pixels of the image, comprises an image store for storing the said digital data; a display; retouching means defining retouch curves for each colour component; and control means for applying the image in the image store to the retouching means and thereafter to the display to display the retouched image and for modifying the retouch curves and is characterised in that the control means modifies the retouch curves so that a second selected image point is retouched to the colour of a first selected image point by modifying a colour component retouch curve for each colour component used to define the original image such that a pixel located at the second selected point will be retouched to have the colour content of a pixel at the first selected point.

Thus, instead of directly modifying colour component retouch curves, as has been done in the past, this is achieved automatically simply by selecting the required colour from another point of the image. It should be understood that in practice the second point will not be retouched to exactly the same colour as the first but as near to it as the form of the retouch curves permit.

The retouch curves will generally be stored in look-up tables.

Typically, the method will comprise a preliminary step of storing initial colour component retouch curves in respective look-up tables, the content of the look-up tables being modified in step (iii).

The invention is applicable to the interactive retouching of both monochrome images and coloured images.

In general, the area of an image to be retouched will be predefined by using a mask which can either be a simple geometric shape, an airbrushed shape, or a bit-mask such as a colour-sensitive mask or a text image.

Preferably, the method further comprises selecting at least one further pair of first and second points on the image; and repeating step (iii) with each pair of points whereby the colour component retouch curves for each colour component are modified such that pixels with the colour content of one of each pair of points are retouched to have the colour content of the other of the pair of points while maintaining the retouching of the previously defined pairs of points substantially unchanged. Thus, after an initial modification of the retouch curves, these curves may be further retouched by defining further points. In general the points of each pair will differ from those of each other pair although in some cases some points could be common to two or more pairs.

Preferably, after each step (iii) the curves are interpolated between the selected points in a conventional manner. This may cause some variation in the previously defined retouching operations where the form of the curves is constrained to one of a number of predetermined smooth shapes.

Since the calculation of retouch curves can be carried out very quickly it is feasible to modify the retouch curves interactively as the operator moves an indicator, such as a cursor, across the displayed image. Thus, the operator will select a point on the image, and then move the cursor over other areas. While this is being done, the curves will be continuously updated, so that the selected point is retouched to the colour of the point currently under the cursor.

BRIEF DESCRIPTION OF THE DRAWINGS

An example of an apparatus and a method in accordance with the present invention will now be described with reference to the accompanying drawings, in which:

FIGS. 2A–2D illustrate respective colour component retouch curves;

FIG. 3 illustrates a further example of a retouch curve;

FIG. 5 is a flow diagram illustrating operation of the apparatus.

DETAILED DESCRIPTION OF AN EMBODIMENT

Figure 1:
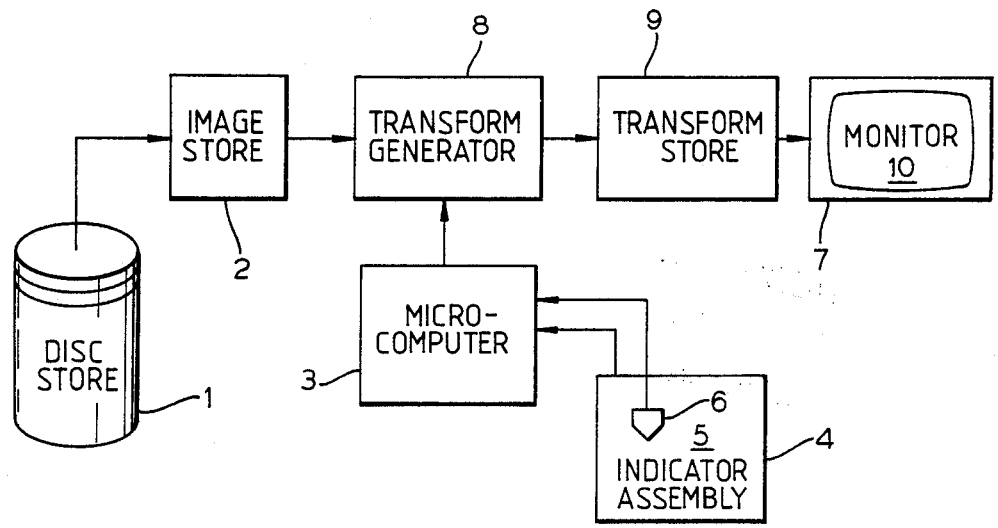
FIG. 1 is a block diagram of the apparatus.
Figure 2A:
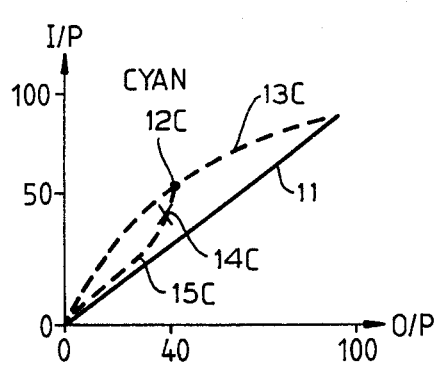
Figure 2B:
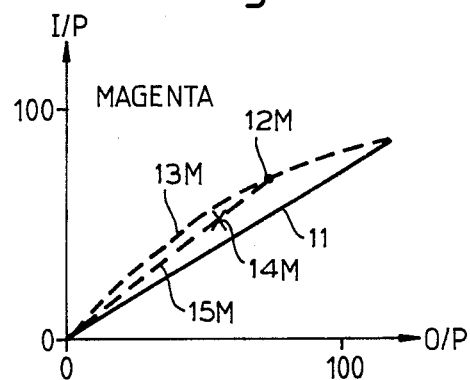
Figure 4A:
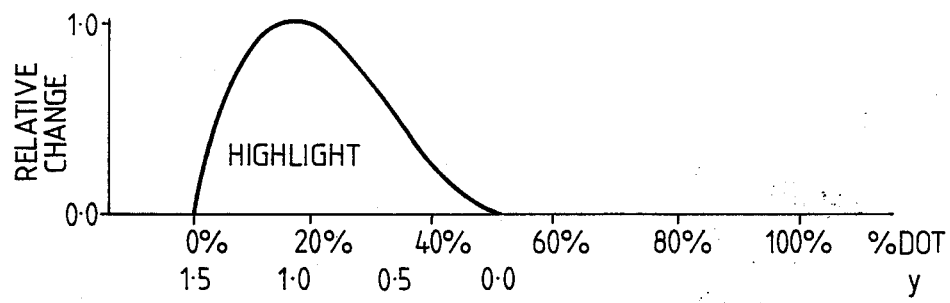
FIGS. 4A–4C illustrate examples of highlight, midtone and shadow retouch curves.
Figure 4B:
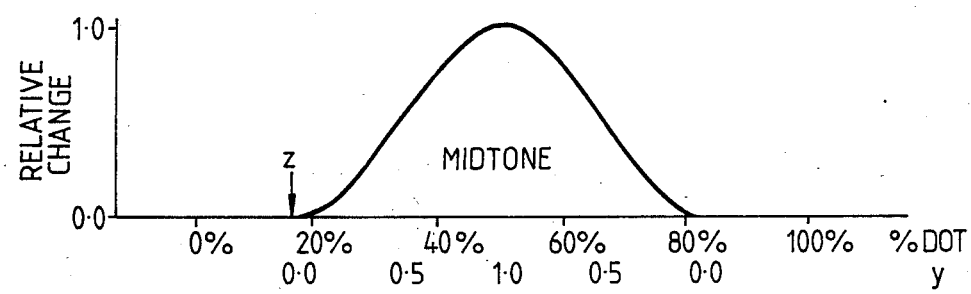
Figure 4C:
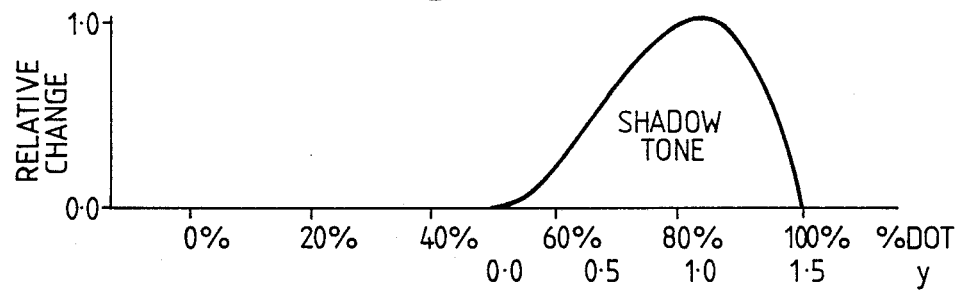

The apparatus shown in FIG. 1 comprises a disc store 1 for storing original images in digital form. Each pixel in an image is defined by four sets of digital data defining the colour content of respective colour components of that pixel, typically cyan, magenta, yellow, and black. The selected image is loaded into an image store 2 under the control of the microcomputer 3. (Step 100, FIG. 5) The microcomputer 3 is controlled by an indicator assembly 4 typically comprising a digitising table 5 and cursor member 6. The image in the store 2 is then displayed on a monitor screen 10 of a monitor 7 (step 102) under the control of a microcomputer 3, the digital data from the store 2 being passed via a transform generator 8 to a transform store 9 defining the monitor screen pixels on a one to one basis.

The transform generator 8 comprises a number of one-dimensional look-up tables (LUTs) four of which define colour component retouch curves. Other LUTs in the transform generator 8 convert the incoming colour component signals to monitor format colour component signals such as red, green, and blue in a conventional manner (See, for example EP-A-0188098).

Initially, the four colour component retouch LUTs are loaded (step 101) with a first set of curves which in the simplest case define the output signal to be equal to the input signal. These curves are illustrated in FIGS. 2A-2D respectively with the initial form of the curves indicated by the solid lines 11. In each case, the vertial axis indicates the input signal in terms of percentage half-tone dot size while the horizontal axis indicates the output signal in terms of percentage half-tone dot size.

The operator views the initially displayed image which will correspond to the image in the store 2 on the monitor screen 10. If he wishes to retouch a small area of the image, he defines that area in a conventional manner (step 103) by for example generating a mask around the area. He can then indicate to the microcomputer 3 using a digitising table 5 the colour which he desires the masked area to take by moving a cursor on the screen to indicate another area of the image displayed (step 104). The microcomputer 3 will then determine the colour content of the pixel located at this second selected position and will then modify each colour component retouch curve accordingly (step 105).

For example, if the cyan color component of the second selected point has a value 40 then the microcomputer 3 will determine that a pixel within the masked region, where the cyan colour component may be 50 should be retouched to the value 40 and this defines a point 12C which must lie on the cyan retouch curve. Having located the point 12C, the microcomputer 3 then interpolates a new cyan retouch curve in a conventional manner as indicated by a dashed line 13C in FIG. 2A. In a similar manner points 12M, 12Y, and 12B are defined for the magenta, yellow, and black colour components respectively and new curves 13M, 13Y, and 13B are interpolated. An example of an interpolation method is shown in US-A-3893166.

This process can be repeated for a second area to be retouched which again is masked to define the area and a second point in the image selected which has a colour of the form to which the masked area is to be retouched. Once again, a new point 14C is derived for the cyan colour component and a new curve 15C interpolated which passes through both the points 14C and 12C. In a similar manner the retouch curves for the other colour components are also modified.

After all the modifications have been completed, the look-up tables are addressed by the data in the image store 2 and the resultant transformed pixel data is stored in the transform store 9 and used to control the display on the monitor 10. If the modification is found to be satisfactory, the microcomputer 3 is then used to modify the original digital data in the image store 2.

The method described above can suffer from some disadvantages since in certain cases it may be that a particular colour component value will be determined to have two different new values in different areas of the image. Secondly, the requested changes may produce undesirable shapes for the retouch curves, for example causing the curves to "fold back" on themselves.

A way of preventing these problems is to generate a final curve from combinations of other shapes which have been predetermined. These other shapes may comprise a family of curve shapes dependent on a single parameter and a selection may be made from these to achieve a "best fit" for all the desired retouch changes. Thus, when the desired retouch changes are entered, they are stored in a table and then the retouch parameters are iteratively modified by the computer to obtain the best fit to the desired retouch changes. In this context, "best fit" would mean the smallest value of the sum of the squares of the difference between the desired retouch value and the generated value, ie a "least-squares" method. This then leads to the generation of smooth retouch curves and avoids the possibility of curves which fold back on themselves.

A more detailed example of an interpolation method will now be described. FIG. 3 illustrates a typical colour component curve similar to any of FIGS. 2A-2D in which it is desired to change a 10% dot to a 12% dot and a 30% dot to a 28% dot. The final curve is shown by a line 20 in FIG. 3. In this case, the degree of modification is controlled by making use of a family of retouch curves dependent on the three parameters HL, MT, SH (highlight, midtone, and shadow respectively). The values of these parameters are the amount of boost (positive or negative) at $16\frac{2}{3}\%$, 50% and $83\frac{1}{3}\%$ respectively.

These curves are defined as follows:

Highlight

Letting y=(50-%dot)/33.333 (for $0 \leq \%dot \leq 50$)

$$\Delta Ret\_HL(x) = HL*(3y^2 - 2y^3),$$

where HL is the boost at 16.667 %dot.

Midtone

Letting $$y = 1 - |50\% - \%\,dot|/33.333 \text{ (for } 33.333 \leq \%\,dot \leq 66.667)$$
$$= 0 \text{ otherwise}$$
$$\Delta Ret\_SH(x) = MT * (3y^2 - 2y^3),$$

where MT is the boost at 50 %dot.

Shadow tone

Letting $$y = (\% \ dot - 50)/33.333 \text{ (for } 50 \leq \% \ dot \leq 100)$$
$$= 0 \text{ otherwise}$$
$$\Delta Ret\_SH(x) = SH * (3y^2 - 2y^3),$$

where SH is the boost at 83.333 %dot.

The retouch operation picks the best values of HL, MT and SH which generate a combined retouch curve passing through, or close to, the required points. First, the dependence on HL, MT and SH at the particular sample values is calculated. Then the final position of the retouched point is calculated according to the formula:

$$Ret\_HL/MT/SH(x) = x + \Delta Ret\_HL(x) + \Delta Ret\_MT(x) + \Delta Ret\_SH(x)$$

At 10% dot, the ΔRet MT and ΔRet SH are both zero, so the final retouch curve only depends on the value of HL. Substituting 10% into the equation given above gives $\Delta Ret\ HL(10) = HL*(3y^2 - 2y^3)$.

Thus the total retouch at this point:

$$Ret\ HL(MT/SH(10)) = 10 + 0.864*HL.$$

Similarly, finding the dependence of the retouch curve at 30% dot, gives $Ret\ HL/MT/SH(30) = 30 + 0.648HL + 0.352MT.$ The desired solution is:

$$Ret - HL/MT/SH(10) = 12$$

$$Ret - HL/MT/SH(30) = 28$$

These become respectively:

$$10 + 0.864HL = 12$$

$$30 + 0.648HL + 0.352MT = 28$$

This example can be solved algebraically, giving:

$$HL = 2.3148 \text{ and } MT = 9.9432.$$

This can be extended to further points if required.

It should be recognised that this example has an algebraic answer. In general a "least squares" or other approximation will be required. This will mean that the final curve does not necessary go through any of the desired points, which is not necessarily a problem, as a smooth curve is desired. In any event, if the points are sampled from the image, it is possible to get inconsistent requests, eg. both 10%->12% in one place, and 10%->8% in another.

I claim:

1. A method of interactively modifying an image represented by digital data defining the colour component content of pixels of said image, the method comprising
    (i) providing a colour component retouch curve for each of the colour components which define the pixels of said image;
    (ii) displaying a representation of said image on a monitor;
    (iii) selecting first and second points on said display image; and
    (iv) modifying the colour component retouch curve for each colour component used to define said image to provide modified colour component retouch curves such that a pixel located at said second selected point will be retouched to have the colour content of a pixel at said first selected point in accordance with said modified colour component retouch curves.

2. A method according to claim 1, further comprising a preliminary step of storing initial colour component retouch curves in respective look-up tables, the content of said look-up tables being modified in step (iii).

3. A method according to claim 1, further comprising selecting at least one further pair of first and second points on said image; and repeating step (iii) with each pair of said points whereby said colour component retouch curves for each colour component are modified such that pixels with the colour content of one of each pair of points are retouched to have the colour content of the other of the pair of points while maintaining the retouching of the previously defined pairs of points substantially unchanged.

4. A method according to claim 1, wherein after each step (iii) said retouch curves are interpolated between the selected points.

5. Apparatus for interactively modifying an image represented by digital data defining the colour component content of pixels of the image, the apparatus comprising an image store for storing the said digital data; a display; retouching means defining retouch curves for each colour component; and control means for applying said image in said image store to said retouching means and thereafter to said display to display the retouched image and for modifying said retouch curves, wherein said control means modifies said retouch curves so that a second selected image point is retouched to the colour of a first selected image point by modifying a colour component retouch curved for each colour component used to define the original image such that a pixel located at said second selected point will be retouched to have the colour content of a pixel at the first selected point.

6. Apparatus according to claim 5, wherein said retouching means comprises a set of look-up tables.

* * * * *